Nov. 16, 1926.

H. RIEGGER

FILTER CHAIN

Filed Sept. 21, 1922      3 Sheets-Sheet 1

1,606,807

Inventor
Hans Riegger
by Knight Bros.
Attys.

Nov. 16, 1926.
H. RIEGGER
FILTER CHAIN
Filed Sept. 21, 1922    3 Sheets-Sheet 2
1,606,807
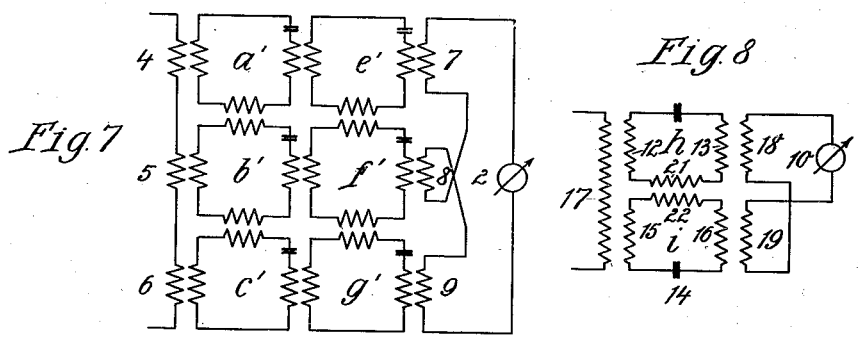
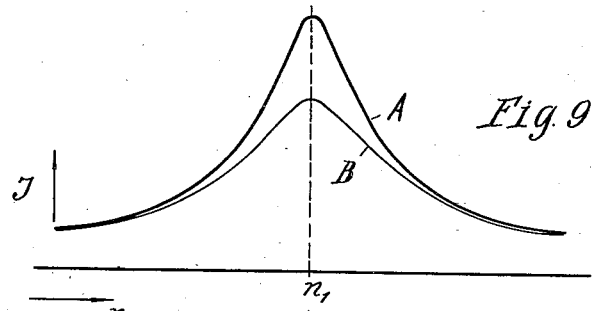
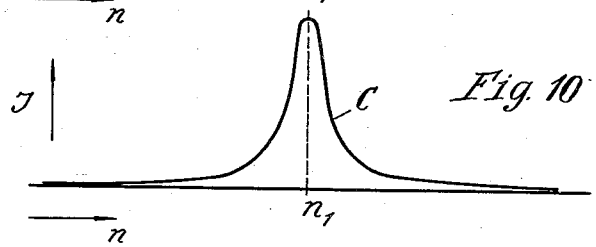
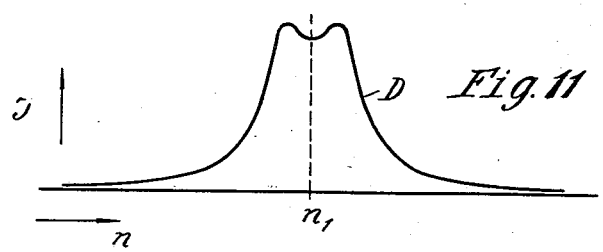
Inventor
Hans Riegger
By Knight Bros.

Nov. 16, 1926.
H. RIEGGER
1,606,807
FILTER CHAIN
Filed Sept. 21, 1922  3 Sheets-Sheet 3

Inventor
Hans Riegger

Patented Nov. 16, 1926.

1,606,807

UNITED STATES PATENT OFFICE.

HANS RIEGGER, OF BERLIN-PANKOW, GERMANY, ASSIGNOR TO SIEMENS & HALSKE, AKTIENGESELLSCHAFT, OF SIEMENSSTADT, NEAR BERLIN, GERMANY, A CORPORATION OF GERMANY.

FILTER CHAIN.

Application filed September 21, 1922, Serial No. 589,601, and in Germany October 5, 1921.

It is known to use for the reception of electric vibrations of high frequency, filter chains which permit oscillations within a certain frequency range to pass through, but which suppress oscillations outside of this range. Such a filter chain comprises a series of electric oscillatory circuits through which the oscillations pass successively. Such filter chains have the drawback that the oscillating currents transmitted therethrough are subject to a time lag whereby the growth and the establishment of the steady value of the received current may be so retarded as to make the reception of high speed telegraph signals difficult, if not impossible, on account of the resulting signal distortion. As the number of oscillating circuits is increased, for the purpose of securing greater selectivity, the distortion, due to the time required for the growth of the current in each circuit, is proportionately increased.

The present invention provides improved means and method of using them, by which said drawback is effectively overcome, for which purpose, according to the invention, the oscillatory circuits are simultaneously excited.

To make the essence of my invention clear reference is made to the accompanying drawings, in which.

Figs. 5 to 14 inclusive show the connection, and resonance curves respectively, of various constructional forms of the subject matter of my invention.

Figures 1, 2:
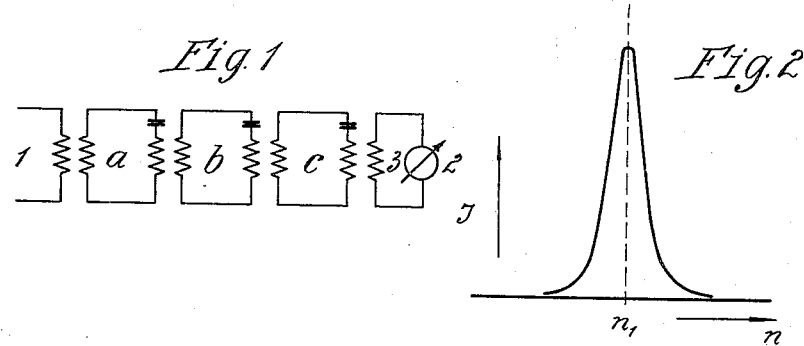
Fig. 1 shows the connection of a filter chain of known type.
Figs. 2, 3 and 4 show resonance curves of the known filter chains.

Referring to Fig. 1:

The arriving high-frequency current is led through the windings 1 in order to become perceptible in a receiver 2 after having passed through the filter chain. The latter consists, in the example shown, of three electric oscillatory circuits $a$, $b$, $c$, though it may consist of a greater or smaller number of oscillatory circuits. By the windings 1, the electric oscillatory circuit $a$, by the latter the second oscillatory circuit $b$, and by the second the third oscillatory circuit $c$, is excited. The latter acts on the transformer winding 3 to which the receiver 2, which may have any suitable form, is connected.

Figures 3, 4:
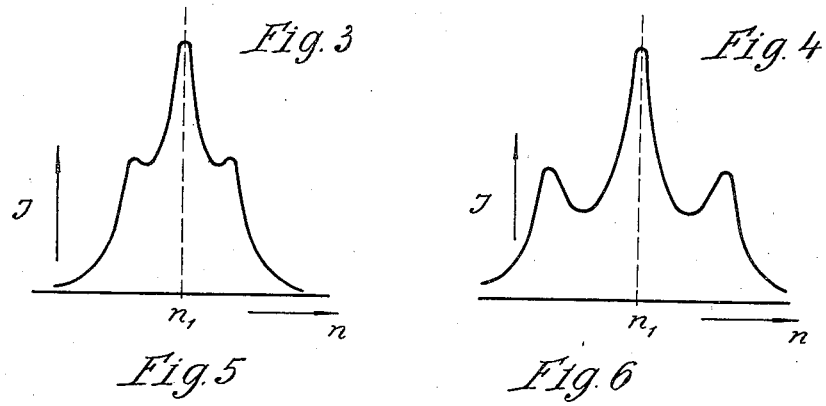
Figures 5, 6:
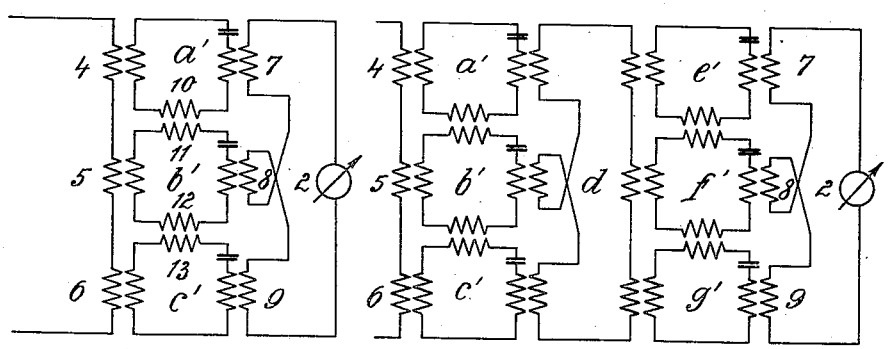

A suitable connection, according to the present invention, is represented in Fig. 5. The arriving electric oscillatory currents passed through the windings 4, 5, 6 by which the electric oscillatory circuits $a'$, $b'$, $c'$ are simultaneously excited. The oscillatory circuits act on the transformer windings 7, 8, 9 to which the receiver 2 is connected. Similar to the conventional, prior method, shown in Fig. 1, the oscillatory circuits $a'$ and $b'$ are coupled with each other, namely through the coils 10 and 11, as are also the oscillatory circuits $b'$ and $c'$ through the coils 12 and 13. The filtering action attained by such a connection, is as perfect as with the prior art filter chain shown in Fig. 1. Even the same resonance curves can be obtained. Resonance curves obtained with the connection shown in Fig. 1, are represented in Figs. 2, 3 and 4. In said diagrams, the current $J$ acting in the receiver 2 is represented as a function of the received frequencies $n$. If the oscillatory circuits $a$, $b$, $c$ are tuned to the frequency $n_1$, and if further they have the same damping, and if finally they are coupled with each other uniformly but rather loosely, the resonance curve shown in Fig. 2 is produced. By choosing the coupling between the individual chain links somewhat closer, so that coupling frequencies become perceivable, the resonance curve shown in Fig. 3 is produced. A filter chain with such a resonance curve has still the advantage that the frequencies are well perceptible though they deviate somewhat from the desired frequency $n_1$, which can hardly be avoided in practice.

With a still closer coupling, the coupling frequencies become more pronounced so that the resonance curve shown in Fig. 4 is produced, in which the range of the perceptible frequencies is still further increased.

Thus, such filter chains can be made to suit the requirements of practical working.

The same adaptability applies to the filter chain according to the present invention, and of which the first constructional form is shown in Fig. 5. If, for instance, the electromotive forces developed in the coils 7 and 9 are arranged to counteract the electromotive force developed in the coil 8, if further half as strong an electromotive force is induced by the windings 4 and 6 in the oscillatory circuits $a'$ and $c'$ as by the windings 5 in the oscillatory circuit $b'$, and if finally the windings 11 act transformatorily on the windings 10 in opposite direction to that of the windings 12 on the windings 13, exactly the same resonance curves are produced as are shown in Figs. 2, 3 and 4 for the filter chain of Fig. 1.

The form of the resonance curve may be further varied by changing the damping constants of the three oscillatory circuits between each other, as well as the coupling degree between windings 10 and 11, and windings 12 and 13 respectively. Thereby, it is possible to bring, in the resonance curves shown in Figs. 3 and 4, the three maxima to about the same height, so that the contour of the curves together approaches the rectangular shape, which is the most convenient one for telegraphing.

The whole filter chain shown in Fig. 5 may further be considered as one single member, and the filter action may further be increased by a series connection of a plurality of such members. Such a connection is represented in Fig. 6. The arriving electric oscillatory currents flow through the windings 4, 5, 6 and become perceptible in the receiver 2 after having passed through the filter chain. Firstly, the oscillatory circuits $a'$, $b'$, $c'$ are simultaneously excited and act upon an aperiodic circuit $d$ which in turn excites the oscillatory circuits $e'$, $f'$, $g'$. The latter produce in the windings 7, 8, 9 electromotive forces which act upon the receiver 2. The aperiodic circuit $d$ can also be omitted, so that the oscillatory circuit $a'$, acts on $e'$, $b'$ on $f'$, and $c'$ on $g'$, as is represented in Fig. 7.

The idea of my invention can also be reduced to practice with two oscillatory circuits only. Such a connection is represented in Fig. 8. The two oscillatory circuits or chain links are designated by the reference letters $h$ and $i$. The oscillatory circuit $h$ consists of the condenser 11 and the windings 12 and 13. The oscillatory circuit $i$ consists of the condenser 14 and the windings 15 and 16. The windings 12 and 15 form the secondary windings of a transformer, through the primary windings 17 of which the arriving electric currents are led. The windings 13 and 16 are magnetically coupled with the coils 18 and 19, which in turn are connected with the indicating apparatus 10, but in such a way that the difference only of the currents flowing therein becomes operative, as is shown by the reverse connection of coils 18 and 19 to each other. The oscillatory circuit $h$ is assured to have a smaller damping constant than the oscillatory circuit $i$. In Fig. 9, the resonance curves of the two oscillatory circuits are drawn, e. g. the current amplitudes occurring therein as a function of the frequency $n$. $n_1$ is the frequency to which both oscillatory circuits are tuned. The figure shows that the resonance curve A of the oscillatory circuit $h$, owing to the smaller damping, has a considerably higher maximum than the curve B of the oscillatory circuit $i$. The farther, however, the frequency varies from the tuning frequency, the smaller is the influence of the damping, and the more the shape of the curves A and B approach each other. The resultant of the amplitudes, which becomes operative in the receiver 10, is drawn in Fig. 10 as ordinate. The curve C produced is to be considered as resonance curve of the whole system. For sake of comparison, double the scale is used for this ordinate. The curve C shows that at a certain frequency, which is different from $n_1$, the current amplitudes are considerably smaller than in one of the curves A or B and that they disappear almost entirely at the limits of the frequency range represented. The suppression of undesirable frequencies is thus essentially improved by the subject matter of the present invention. The decrease of the action, which is due to the connection in opposition, can be equalized by the insertion of a boosting tube and even changed to an increase. As shown in Fig. 8, the oscillatory circuits $h$ and $i$ are coupled with one another by the windings 21 and 22. By a proper choice of the coupling degree, a common resonance curve can be obtained, at which occur two maxima, which are more or less remote from one another according to the degree of coupling. These maxima can be approached to one another so much that they coincide. In practice, this results then in one single but broader maximum. A resonance curve of this type is shown in Fig. 11 at D. The broadened maximum or peak is, as already mentioned, frequently of great advantage, as it is not always possible to keep the frequency of the waves transmitted exactly constant.

Figure 12:
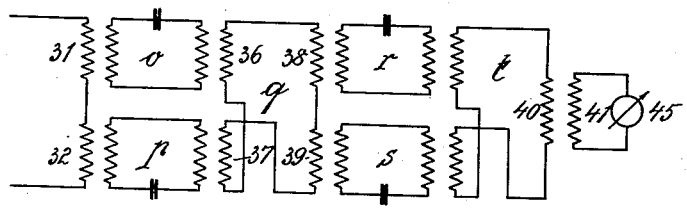

As already mentioned above, the main advantage of the invention resides in the feature that not all the oscillatory circuits or links of the chain are successively energized by the oscillatory currents, but a plurality of them are traversed simultaneously. To attain this object, however, not all the oscillatory circuits need to be traversed simultaneously by the oscillatory currents. Constructional forms of my invention, in which a group of oscillatory circuits are traversed simultaneously, and another group successively, by the oscillatory currents, are shown in Figs. 6 and 7 already decribed. A further constructional form of this kind is shown in Fig. 12: The arriving oscillatory currents are led through the windings 31 and 32. By the windings 31 the oscillatory circuit $o$, and by the windings 32 the oscillatory circuit $p$, are excited. The two oscillatory circuits induce each a current in the windings 36 and 37, which are connected in opposition, so that their difference only becomes operative in the electric circuit $q$. In the aperiodic circuit $q$ are located the primary transformer windings 38 and 39, which in turn excite the oscillatory circuits $r$ and $s$. The latter produce again in the aperiodic circuit $t$ a differential current, which is fed through the windings 40 to the windings 41 and thus to the receiver 45. The characteristics of the oscillatory circuits $o$ and $p$ are not exactly alike. They have either a somewhat different own frequency or somewhat different damping constants. Also in this case, as already explained with reference to Fig. 8, the action, with strongly deviating frequencies, on the aperiodic circuit $q$ becomes almost zero, while, with currents of the desired frequency, the action is increased. The same applies to the oscillatory circuits $r$ and $s$.

With this connection, each two oscillatory circuits are excited successively, namely oscillatory circuits $o$ and $r$ on one hand, and $p$ and $s$ on the other hand. Thus, while here the current must be established successively in two oscillatory circuits, this requires less time and results in less distortion than the establishment of the currents in four successively arranged oscillatory circuits. The result is considerably more effective than that of a filter chain with two oscillatory circuits only. The same result is obtained if the oscillatory circuits $o$ and $p$ have the same natural frequency but a somewhat different damping constant.

Figure 13:
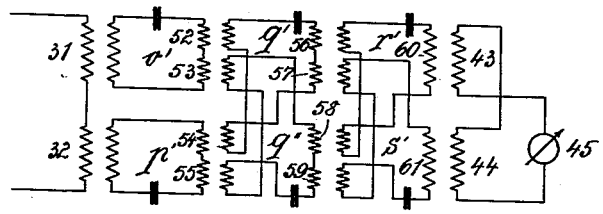

Another modification is shown in Figure 13. The arriving oscillatory currents again pass through the windings 31, 32 by which the oscillatory circuits $o'$ and $p'$ are excited. Oscillatory circuit $o'$ contains the primary coils of two transformers 52 and 53, and the oscillatory circuit $p'$ contains the primary coils of transformers 54 and 55. The secondary windings of transformers 52 and 54 are located in an oscillatory circuit $q'$ and are connected in opposition to each other in that circuit. The secondary windings of transformers 53 and 55 are located in oscillatory circuit $q''$ and are in that circuit connected against each other. Consequently in each of the two oscillatory circuits $q'$ and $q''$ a current will flow which depends upon the difference between the currents in $o'$ and $p'$.

In the oscillatory circuit $q'$ the primary coils of transformers 56 and 57, and in oscillatory circuit $q''$ the primary windings of transformers 58 and 59 are located. The transformed electromotive forces from transformers 56 and 58 are similarly opposing each other in oscillatory circuit $r'$, and the electromotive forces transformed by 57 and 59 oppose each other in the oscillatory circuit $s'$. These circuits being arranged similar to the circuits $q'$ and $q''$ as shown in Figure 13. Oscillatory circuits $r'$ and $s'$ contain respectively the primary windings 60 and 61 of a coupling transformer which respectively are coupled with the secondary windings 43, 44, which are located in the circuit which contains the indicating device 45. As will be noted from Figure 13 the secondaries 43 and 44 are again connected against each other so that only the difference of the electromotive forces induced in them acts upon the receiver 45.

In this particular modification, three groups of oscillatory circuits are arranged in series, each group receiving the oscillatory currents to be transmitted simultaneously from the preceding group and transmitting it simultaneously to the succeeding group. No aperiodic circuits are provided in this particular modification.

Figure 14:
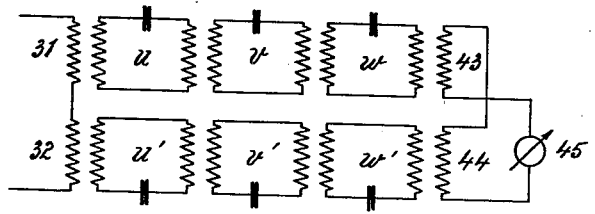

The purpose sought by the present invention may, however, be attained by simply providing two ordinary filter chains in parallel with each other such as is shown in Figure 14. One of these filter chains consists of the oscillatory circuits $u, v, w,$ and the other of the oscillatory circuits $u', v', w'$. Both chains are simultaneously excited from the input transformer windings 31 and 32. The last links $w$ and $w'$ of the two chains simultaneously act upon the coupling transformer windings 43 and 44, which are arranged in the receiver circuit in opposition to each other as described with reference to Figure 13. However, in practical use, of such a simple chain as is shown in Figure 14, the tuning in of the individual self-inductance and capacities causes considerable difficulties.

What I claim is:—

1. In a system, including a plurality of oscillatory circuits tuned to the same frequency, for selectively transmitting a wave within a prescribed continuous range of frequencies from a source to a load circuit, the method of operation which comprises simultaneously impressing a wave to be transmitted upon the oscillatory circuits to produce an oscillating current in each circuit, and supplying said oscillating currents, one out of phase with the others, to the load circuit.

2. In a system, including a plurality of oscillatory circuits tuned to the same frequency, for selectively transmitting a wave within a prescribed continuous range of frequencies from a source to a load circuit, the method of operation which comprises simultaneously impressing a wave to be transmitted upon the oscillatory circuits to produce an oscillating current in each circuit, and supplying said oscillating currents, one in opposite phase with respect to the others, to the load circuit.

3. In a system, including a plurality of oscillatory circuits each tuned to the same frequency, for selectively transmitting a wave within a prescribed continuous range of frequencies to a receiving circuit, the method of operation which comprises simultaneously impressing a wave to be transmitted upon a group of oscillatory circuits to produce an oscillating current in each circuit, simultaneously impressing the oscillating currents produced in the first group of circuits upon the oscillatory circuits of a succeeding group to produce in each thereof an oscillating current, and supplying to the receiving circuit the oscillating currents produced in the last group of circuits so that one of said currents is applied differentially with respect to the other currents.

4. A wave transmission system for selectively transmitting waves within a prescribed continuous range of frequencies comprising a group of oscillatory circuits all tuned to the same frequency, a wave source, a load circuit, means for impressing waves from said source directly upon each of said oscillatory circuits whereby oscillating currents are produced in each of said circuits, and circuit means for impressing upon said load circuit, waves derived from each of said oscillatory circuits, said circuit means being adapted to impress the waves from certain of said circuits in opposite phase from the waves derived from the others of said circuits.

5. A wave transmission system for selectively transmitting waves within a prescribed continuous range of frequencies comprising a wave source, a load circuit, a group of oscillatory circuits all tuned to the same frequency, said oscillatory circuits being mutually coupled in tandem, means for impressing upon each of said circuits directly waves from said source whereby oscillating currents are produced in each of said circuits, and circuit means coupled individually to each of said oscillatory circuits and to said load circuit, said circuit means being adapted to derive directly from each of said oscillatory circuits waves corresponding to the oscillatory currents, certain of said waves being in opposite phase to the others, and to impress said waves upon the load circuit.

6. A wave transmission system for selectively transmitting waves within a prescribed continuous range of frequencies, comprising in combination a supply line carrying the energy, a group of oscillatory circuits, all having the same natural frequency, a plurality of transformers having primary and secondary coils, the primary coils being located in said supply line and each of the secondary coils being located in one of said oscillatory circuits for transferring the arriving oscillating energy simultaneously into said group of oscillatory circuits, a circuit containing a receiving device for said energy, and means for coupling said receiver circuit with said group of oscillatory circuits for transferring the energy oscillating in said circuits to said receiver.

7. A wave transmission system for selectively transmitting waves within a prescribed continuous range of frequencies, comprising in combination a supply line carrying the energy, a group of oscillatory circuits, all having the same natural frequency, a plurality of transformers having primary and secondary coils, the primary coils being located in said supply line and each of the secondary coils being located in one of said oscillatory circuits for transferring the arriving oscillating energy simultaneously into said group of oscillatory circuits, a circuit containing a receiving device for said energy, and means for coupling said receiver circuit with said group of oscillatory circuits for transferring the energy oscillating in said circuits to said receiver, said coupling means consisting of a suitable number of oscillatory circuits.

8. A wave transmission system for selectively transmitting waves within a prescribed continuous range of frequencies, comprising in combination a supply line carrying the energy, a group of oscillatory circuits, all having the same natural frequency, a plurality of transformers having primary and secondary coils, the primary coils being located in said supply line and each of the secondary coils being located in one of said oscillatory circuits for transferring the arriving oscillating energy simultaneously into said group of oscillatory circuits, a circuit containing a receiving device for said energy, and means for coupling said receiver circuit with said group of oscillatory circuits for transferring the energy oscillating in said circuits to said receiver, said coupling means consisting of a suitable number of oscillatory circuits and of an aperiodic circuit.

9. A wave transmission system for selectively transmitting waves within a prescribed continuous range of frequencies, comprising in combination a supply line carrying the energy, a group of oscillatory circuits, all having the same natural frequency but different clamping factors, a plurality of transformers having primary and secondary coils, the primary coils being located in said supply line and each of the secondary coils being located in one of said oscillatory circuits for transferring the arriving oscillating energy simultaneously into said group of oscillatory circuits, a circuit containing a receiving device for said energy, and means for coupling said receiver circuit with said group of oscillatory circuits for transferring the energy oscillating in said circuits to said receiver.

10. A wave transmission system for selectively transmitting waves within a prescribed continuous range of frequencies, comprising in combination a supply line carrying the energy, a group of oscillatory circuits, all having the same natural frequency, a plurality of transformers having primary and secondary coils, the primary coils being located in said supply line and each of the secondary coils being located in one of said oscillatory circuits for transferring the arriving oscillating energy simultaneously into said group of oscillatory circuits, coupling coils in said oscillatory circuits for coupling adjacent circuits to each other and a circuit containing a receiving device for said energy, and means for coupling said receiver circuit with said group of oscillatory circuits for transferring the energy oscillating in said circuits to said receiver.

11. A wave transmission system for selectively transmitting waves within a prescribed continuous range of frequencies, comprising in combination a supply line carrying the energy, a group of oscillatory circuits, all having the same natural frequency, a plurality of transformers having primary and secondary coils, the primary coils being located in said supply line and each of the secondary coils being located in one of said oscillatory circuits for transferring the arriving oscillating energy simultaneously into said group of oscillatory circuits, an aperiodic circuit having a plurality of coupling coils, each coupled with one of said oscillatory circuits to simultaneously receive the oscillating energy from all of said oscillatory circuits, some of said coupling coils in said aperiodic circuit being connected in opposition to the other coupling coils, and a receiving device in said aperiodic circuit for indicating the oscillatory energy.

12. A wave transmission system for selectively transmitting waves within a prescribed continuous range of frequencies, comprising in combination a supply line carrying the energy, a group of oscillatory circuits, all having the same natural frequency, a plurality of transformers having primary and secondary coils, the primary coils being located in said supply line and each of the secondary coils being located in one of said oscillatory circuits for transferring the arriving oscillating energy simultaneously into said group of oscillatory circuits, an aperiodic circuit having a plurality of coupling coils, each coupled with one of said oscillatory circuits to simultaneously receive the oscillating energy from all of said oscillatory circuits, some of said coupling coils in said aperiodic circuit being connected in opposition to the other coupling coils, a second plurality of transformers having their primary coils located in series in said aperiodic circuit, a second group of coupled oscillatory circuits, all having the same natural frequency and each of said circuits including a secondary coil of said last-mentioned transformers, a second aperiodic circuit having a plurality of coupling coils, each coupled with one of the oscillatory circuits of said second group to simultaneously receive the oscillatory energy from all of said oscillatory circuits, some of said coupling coils in said second aperiodic circuit being connected in opposition to the other coupling coils, and a receiving device in said second aperiodic circuit for indicating the oscillatory energy.

In testimony whereof I affix my signature.

HANS RIEGGER.